Sept. 17, 1935.   G. A. LYON   2,014,654
TIRE COVER CONSTRUCTION
Filed March 2, 1931   2 Sheets-Sheet 1
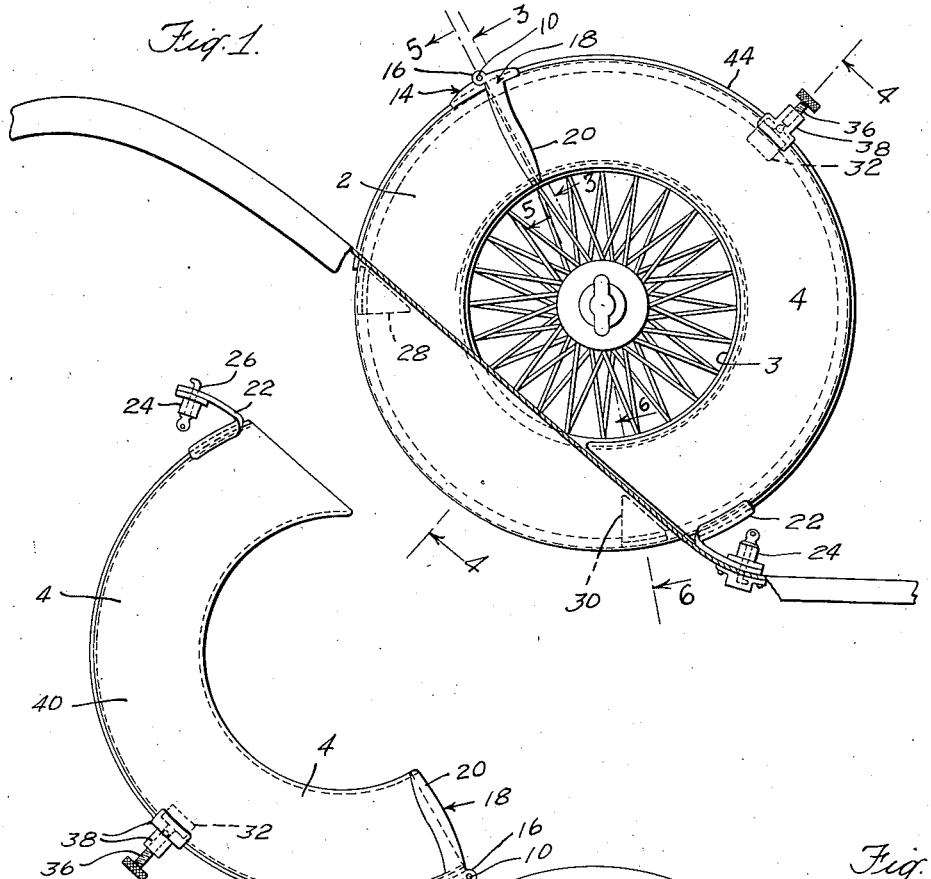
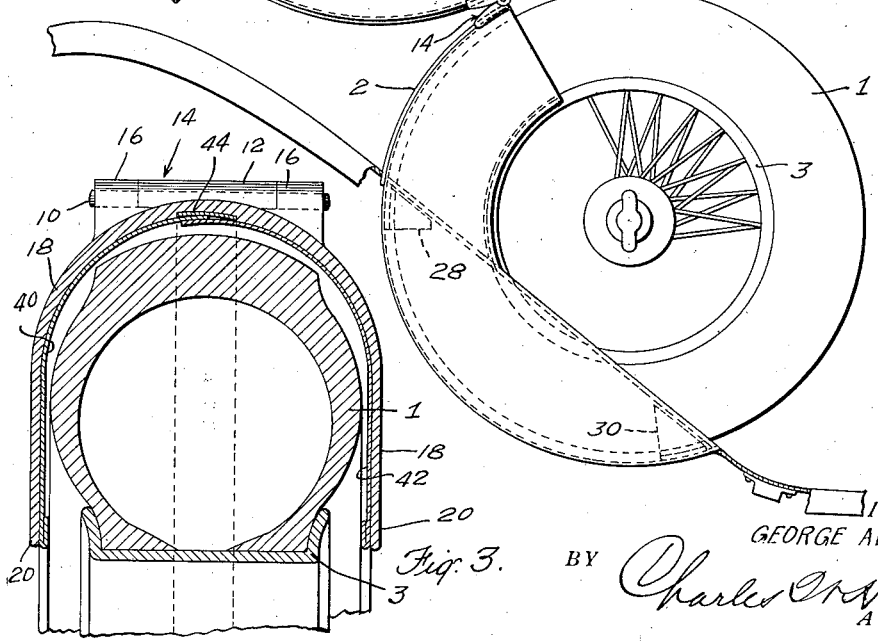
INVENTOR
GEORGE ALBERT LYON
BY Charles O. Wills
ATTORNEYS Sept. 17, 1935.　　　　　G. A. LYON　　　　　2,014,654
TIRE COVER CONSTRUCTION
Filed March 2, 1931　　2 Sheets-Sheet 2
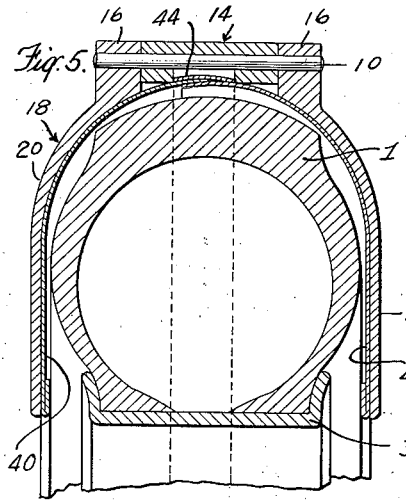
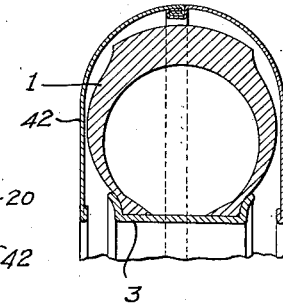
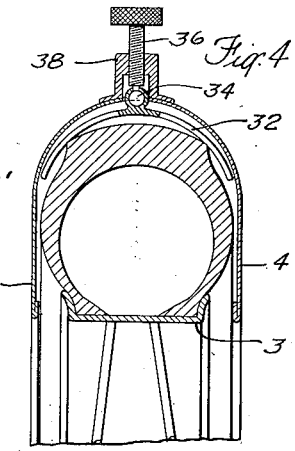
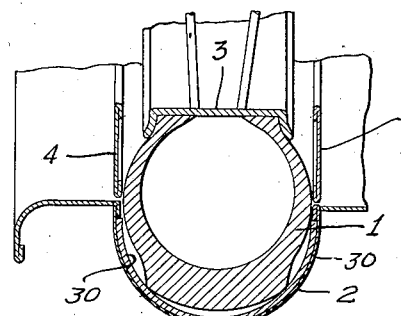
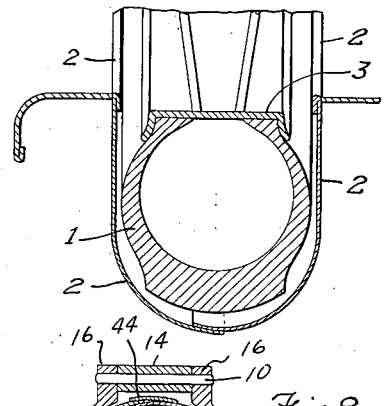
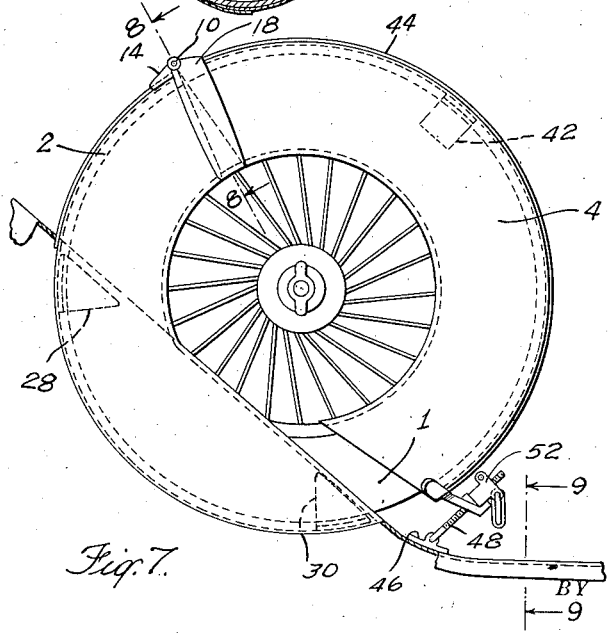
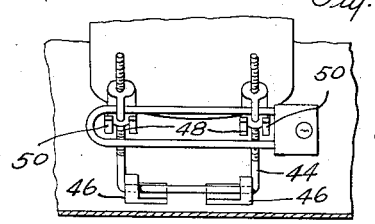
INVENTOR
GEORGE ALBERT LYON
BY
ATTORNEYS Patented Sept. 17, 1935

2,014,654

UNITED STATES PATENT OFFICE 2,014,654

TIRE COVER CONSTRUCTION

George Albert Lyon, Allenhurst, N. J., assignor to Lyon Incorporated, Asbury Park, N. J., a corporation of Delaware Application March 2, 1931, Serial No. 519,338

2 Claims. (Cl. 150—54)

This invention relates to covers for the spare tires of automobiles, and more particularly to tire covers of the class comprising an enclosing casing made of metal or other relatively stiff material.

Certain features of the invention are particularly designed to be embodied in a tire cover construction for application to a tire supported on the fender for an automobile.

Certain important objects of the invention are to improve the construction and mode of operation of devices of the above type for covering spare tires, and to produce a novel and improved construction which will furnish an efficient and satisfactory cover having an attractive appearance for a spare tire supported on the fender of an automobile, and which may be quickly and easily applied to, and removed from the tire.

Another important object of the invention is to produce a novel and improved construction for covering a tire supported on the fender of an automobile, which will hold the tire securely in position on the fender.

With the above and other objects in view, the invention comprises the novel and improved features, constructions and combinations of parts hereinafter described and particularly pointed out in the claims, the advantages of which will be evident to those skilled in the art.

The invention will be clearly understood from the accompanying drawings, illustrating the invention in its preferred form and the following detailed description of the constructions therein shown.

In the drawings, Fig. 1 is a view in side elevation illustrating a construction embodying the invention;

Fig. 2 is a view similar to Fig. 1, illustrating certain of the parts in different positions;

Fig. 3 is a sectional view taken substantially on the line 3—3 of Fig. 1;

Fig. 4 is a sectional view taken substantially on the line 4—4 of Fig. 1;

Fig. 5 is a detail sectional view taken substantially on the line 5—5 of Fig. 1;

Fig. 6 is a detail sectional view taken substantially on the line 6—6 of Fig. 1;

Fig. 7 is a view in side elevation illustrating a modified construction;

Fig. 8 is a detail sectional view taken substantially on the line 8—8 of Fig. 7;

Fig. 9 is a view partly in rear elevation and partly in section taken substantially on the line 9—9 of Fig. 7; and Fig. 10 is a detail sectional view of one of the casing sections illustrating a modified construction.

In the drawings, the tire cover constructions embodying the invention are illustrated as applied to a tire 1 supported on a rim 3. In the construction shown in Figs. 1 to 6, inclusive, the tire cover comprises a section 2 substantially semi-circular in form, secured to the fender for covering the lower forward portion of a tire supported on the fender and a section 4 having a similar form, and movably mounted on the section 2 for covering the upper rear portion of the tire. The bodies of the sections 2 and 4 of the cover are made of relatively stiff sheet material and are preferably formed from sheet metal.

Each of the sections 2 and 4 is concavo-convex in cross section and is provided with a peripheral wall arranged to extend about the peripheral portion of the tire and with side walls projecting inwardly toward the axis of curvature of the section to cover the sides of the tire. The sections 2 and 4 form an annular casing extending from the tread of the tire inwardly substantially to the rim, the casing having a central opening substantially the size of the rim. If desired, however, the casing may be formed to extend from the tread of the tire to the axis thereof. Furthermore, if desired, the cross section of each of the sections 2 and 4 may be such that these sections cover only the outer side surface of the tire resting in the fender well, each section terminating adjacent the margin of the tread on the inner side of the tire adjacent the automobile body.

The section 2 is mounted on the fender within an opening therein, so as to form a fender well, the section being secured to the fender by welding or in any other suitable manner. The section is mounted on the fender so that the forward portion of the section projects for some distance above the fender, as shown in Figs. 1 and 2.

The section 4 is movably mounted on the section 2, preferably by pivoting the section 4 to the section 2 on an axis substantially parallel with the axis of the tire and rim so as to swing in a plane substantially parallel with the central plane of the tire. As shown, the section 4 is pivoted to the section 2 on a pivot pin 10 engaging in an opening in a projection 12 on a hinge bracket 14 secured to the section 2 and in openings in projections 16 on a hinge bracket 18 secured to the section 4. The bracket 18 is provided with side projections 20 arranged to embrace the sections 2 and 4 of the cover, the bracket covering the joint between the sections when the section 4 is closed, as shown in Fig. 1.

The section 4 carries, at its free end, an angular bracket 22, one arm of which is secured to the section and the other arm of which carries a fastening device 24 for securing the section in closed position. As shown, the fastening device consists of a rod 26 mounted to rotate upon a longitudinal axis and having a projection at its lower end extending at right angles to the body of the rod. The lower end of the rod is arranged to pass through a correspondingly shaped slot in the fender and in a reinforcing plate secured to the under side of the fender, the rod, after passing through the slot, being placed in fastening position by turning the rod to position said projection at an angle to the slot.

Devices are preferably secured to the casing to provide a three point support for the tire. Within the casing section 2 are secured, at opposite ends of the fender well, two contact members 28 and 30 for engagement with the tire to support the same at two points out of contact with the wall of the casing. These members are preferably made of yielding sheet material, such as impregnated fabric brake lining, and are laid about the inner surface of the fender well, as shown in Fig. 6. The section 4 of the casing carries a supporting or contact member 32 for engagement with the tire, as shown in Fig. 4. This supporting member 32 is concavo-convex in form, so as to extend over the tread of the tire and is mounted for universal movement by means of a ball and socket joint 34 upon the lower end of a rod 36, threaded into a carrier 38 secured to the section 4. The member 32, with its supporting and actuating structure, constitutes a "push-down" device for holding the tire securely in position in the casing.

In the operation of securing a tire in the casing, the section 4 is moved to open position and the tire is placed in the fender well in engagement with the supporting members 28 and 30. The section 4 is then closed and secured in position by the fastening device 24, the rod 36 having been unscrewed sufficiently to permit the closing and fastening of the section. The rod 36 is then screwed inwardly to cause the supporting member 32 to engage the tire and force the same toward the fender well. As the rod is moved inwardly the action of the contact member 32 forces the tire firmly into engagement with the contact members 28 and 30 in the fender well. The supporting devices 28, 30 and 32 will then hold the tire securely from being displaced in the direction of the central plane of the tire and also from movement in directions transverse to said plane.

In removing a tire from the casing, the screw 36 is first unscrewed. The fastening device 24 is then actuated to release the section 4, and the latter section is swung to open position. This releases the tire which then may readily be rolled out of the section 2.

The sections 2 and 4 of the casing are each preferably constructed from two or more pieces of sheet metal stamped, rolled or otherwise formed into the proper shape and secured together. As shown in the drawings, each of said sections is made from two pieces 40 and 42 of sheet metal formed into similar concavo-convex half sections. These half sections are assembled with their concave faces in opposed relation and with their outer margins overlapping, and these margins are secured together preferably by welding. The joint between these two half sections preferably is covered by a narrow strip 44 of sheet metal secured in place preferably by welding. The casing sections may be constructed in a similar manner from other relatively stiff sheet material found suitable for the purpose.

In the construction shown in Fig. 10, the half sections 40ª and 42ª which make up a casing section are secured together at their adjacent margins by folding the said margins of the sheet material about each other, as clearly illustrated in this figure. In this construction no strip for covering the joint between the half sections is provided.

The construction shown in Figs. 7 and 8 is substantially the same as that shown in Figs. 1 to 6, inclusive, except as hereinafter described. The said construction comprises a fixed casing section 2 and a movable casing section 4, pivoted to the fixed section on a pivot pin 10 engaging in openings in brackets 14 and 18 secured to the respective sections. The tire is supported within the casing section 2 by contact members 28 and 30. All of these parts have substantially the same construction, arrangement and mode of operation as the corresponding parts shown in Figs. 1 to 6, inclusive.

In the construction shown in Figs. 7 and 8, the section 4 carries a contact or supporting member 42 fixed to said section. This contact member preferably consists of material similar to that of the members 28 and 30, and is applied in a similar manner to the casing section. Upon closing the section 4, this contact member engages the tire and forms the third support for the tire. Thus the contact members 28, 30 and 42 form a three point support for the tire and hold the tire out of contact with the casing walls. The section 4 after being closed, is actuated to force the tire toward the fender well. In the construction shown, the device for actuating the section 4 comprises a U-shaped shackle 45 pivoted in brackets 46, secured to the fender. The spaced parallel arms of this shackle are respectively arranged to engage in slots 48 in spaced brackets 50 secured to the casing section. The said arms of the shackle are threaded to receive wing nuts 52 which are adapted to engage the brackets 50.

The tire is firmly secured in the fender well by screwing down the nuts 52 so that they exert a heavy pressure on the brackets 50. The casing section 4 thus constitutes a "hold-down" or "push-down" device for the tire.

The constructions shown in the drawings not only form satisfactory and efficient covers and "push-down" or "hold-down" devices for inflated tires, but will operate effectively in holding deflated tires in position on a fender. In each of these covers and "hold-down" constructions the tire is not only held firmly in the fender well so that it will not be dislodged by a movement of the tire in the general direction of the plane thereof, but the tire is effectively held from lateral movement or vibration.

Each of the constructions shown is highly ornamental and attractive in appearance and forms an effective covering for the tire to protect the same against deterioration resulting from exposure to the weather, and against injury produced by accidental contacts.

It is obvious that the tire cover and "hold-down" devices shown in the present application are as well applicable to a tire supported on a running board as to a tire supported on a fender, as shown in this case. It is, therefore, to be understood that the term "fender" employed in the claims is not restrictive, but that this term also applies to a running board structure.

It is to be understood that the invention is not limited to the particular construction and arrangement of parts of the illustrated embodiment of the invention, but that the invention may be embodied in other forms within the scope of the claims.

Having explained the nature and object of the invention, and having specifically described a construction embodying the invention in its preferred form, what is claimed is:

1. In a combination spare tire cover and carrier construction, a fender having an opening therein substantially less than the diameter of the spare tire and a spare tire cover comprising an arcuate section of channeled cross section constructed to extend around less than one-half the outer periphery of the tire and having a portion projecting downwardly through said fender opening and supported by the fender to form a fender-well for the tire, said section including a second portion above the fender at the forward end of the well, a second arcuate section constructed to extend about the outer periphery of the tire above the well and having one end pivotally connected to said second portion at the forward end of the well and its other end spaced from the rear end of said first section, and means for forcing said other end of the second section toward the rear end of said first section to force the tire downwardly into the well and to cause said second section to tightly embrace the tire and to accommodate slight variations in contour and size of the spare tire.

2. In a combination spare tire cover and carrier construction, a fender having an opening therein substantially less than the diameter of the spare tire and a spare tire cover comprising an arcuate section of channeled cross section constructed to extend around less than one-half the outer periphery of the tire and having a portion projecting downwardly through said fender opening and supported by the fender to form a fender-well for the tire, said section including a second portion above the fender at the forward end of the well, a second arcuate section constructed to extend about the outer periphery of the tire above the well and having one end pivotally connected to said second portion at the forward end of the well and its other end spaced from the rear end of said first section, and means for forcing said other end of the section toward the rear end of said first section to force the tire downwardly into the well and to cause said second section to tightly embrace the tire and to accommodate slight variations in contour and size of the spare tire, and said two sections having interior spacers for providing a three point support for the tire inside the cover after said second section is forced into tight cooperation with the tire.

GEORGE ALBERT LYON.